(12) United States Patent
La Gesse et al.

(10) Patent No.: US 7,836,445 B2
(45) Date of Patent: Nov. 16, 2010

(54) TECHNIQUE FOR INSTALLING A STATION DEVICE DRIVER

(76) Inventors: Robert Derek La Gesse, 100 Northcrest Dr., Castle Hills, TX (US) 78213;
Timothy Gordon Godfrey, 12839 King St., Overland Park, KS (US) 66213

( * ) Notice: Subject to any disclaimer, the term of this patent is extended or adjusted under 35 U.S.C. 154(b) by 1057 days.

(21) Appl. No.: 10/693,051

(22) Filed: Oct. 24, 2003

(65) Prior Publication Data

US 2004/0236823 A1    Nov. 25, 2004

Related U.S. Application Data

(60) Provisional application No. 60/454,539, filed on Mar. 13, 2003.

(51) Int. Cl.
*G06F 9/445* (2006.01)
(52) U.S. Cl. ................. 717/176; 717/174; 717/175; 717/177; 717/178
(58) Field of Classification Search .......... 717/174–178
See application file for complete search history.

(56) References Cited

U.S. PATENT DOCUMENTS

| | | | | |
|---|---|---|---|---|
| 6,941,465 B1 * | 9/2005 | Palekar et al. | ................... | 726/1 |
| 6,944,859 B2 * | 9/2005 | Bunger | ................... | 717/178 |
| 7,080,132 B2 * | 7/2006 | Cheshire | ................... | 717/168 |
| 7,149,978 B1 * | 12/2006 | Maffezzoni | ................... | 717/174 |
| 7,174,456 B1 * | 2/2007 | Henry et al. | ................... | 713/158 |
| 2002/0147973 A1 * | 10/2002 | Fordemwalt et al. | ........ | 717/174 |
| 2004/0015961 A1 * | 1/2004 | Chefalas et al. | ............ | 717/178 |

\* cited by examiner

*Primary Examiner*—Wei Y Zhen
*Assistant Examiner*—Junchun Wu

(57) ABSTRACT

A technique is disclosed that provides a host computing device user with convenient access to a network. In the illustrative embodiment of the present invention, a telecommunications station stores device driver files. The host computing device installs a device driver. Once properly configured, the host computing device controls the station, through the device driver, to transmit data blocks into a shared-communications medium. The host computing device also receives a first portion of network-specific data (e.g., network configuration information, security configuration information, etc.) that enables the host computing device to properly configure itself to communicate via the network of interest.

28 Claims, 5 Drawing Sheets

TECHNIQUE FOR INSTALLING A STATION DEVICE DRIVER

CROSS-REFERENCE TO RELATED APPLICATIONS

This application claims the benefit of U.S. provisional application Ser. No. 60/454,539, filed Mar. 13, 2003, entitled "Technique for Installing a Network Interface Card Driver," which is herein incorporated by reference.

FIELD OF THE INVENTION

The present invention relates to telecommunications in general, and, more particularly, to wireless local area networks.

BACKGROUND OF THE INVENTION

FIG. 1 depicts a schematic diagram of network 100 in the prior art. Network 100 operates in accordance with a set of protocols, and comprises shared-communications medium 102 and telecommunication stations 101-1 through 101-K, wherein K is a positive integer. Network 100, for example, can be an Institute of Electrical and Electronics Engineers (IEEE) 802.11 local area network with shared-communications medium 102 representing the radio frequency spectrum with which stations 101-1 through 101-K communicate.

Host computing devices (e.g., personal computers, personal digital assistants, etc.) use stations 101-1 through 101-K to communicate with each other or with other devices. Examples of other devices include printer servers, email servers, file servers, etc. Each of stations 101-1 through 101-K connects with a host computing device in the form of a peripheral card called a "network interface card" (NIC).

Wireless network providers are making wireless media, such as shared-communications medium 102, available in an increasing variety of places, such as coffee shops, fast food restaurants, business-class airport lounges, etc. Many of these wireless network providers require a user to have a pre-existing account or at least a properly-configured station. A potential user that wanders into an area served by a wireless network—for instance, to wait a few hours for a flight—might have handy a host computing device, such as a laptop. The potential user, however, might not have handy a network interface card that enables convenient access to the particular network of interest.

SUMMARY OF THE INVENTION

The present invention provides a host computing device user with convenient access to a network by enabling the efficient configuring of a telecommunications station with the host computing device. In the illustrative embodiment of the present invention, the telecommunications station stores device driver files and network-specific data in its memory (e.g., flash memory, etc.). When the user connects the station to the host computing device, the host computing device installs a device driver from the device driver files received from the station. Once properly configured, the host computing device controls the station, through the device driver, to transmit data blocks into a shared-communications medium.

The network-specific data defines the network of interest by defining a network configuration and a security configuration. The host computing device receives a first portion of the network-specific data that enables the host computing device to properly configure itself to access the particular network of interest. In some embodiments, the host computing device displays the first portion of network-specific data to inform the user about the network. The network provider can control the amount of information about the network that the user sees by setting the content of the first portion of network-specific data ahead of time.

The station, in some embodiments, also stores a second portion of network-specific data that can neither be read nor overwritten by the host computing device. Only the station can use the second portion of data. The second portion can comprise restricted information such as encryption keys, authentication keys, etc., allowing control over the host computing device's access to the network. Control might include setting the length of time for which the user is allowed to access the network.

In one operational scenario, the station, initially separated from the host computing device, is in the form of a network interface card. The user that enters the network purchases the network interface card on the spot (e.g., from a vending machine, etc.). To facilitate the user's experience, installation takes advantage of plug-and-play in combination with an AutoRun file stored in the station. The station is self-installing, in that no other media is required to enable the station to function on the host computing device, even where the host computing device has had no station device driver previously installed. The user does not necessarily have to enter network-specific parameters, since the network configuration and security configuration are pre-stored in the network interface card.

An illustrative embodiment of the present invention comprises: transferring a device driver file and a first portion of network-specific data from a station to a host computing device; installing at the host computing device a device driver that is represented by the device driver file; and transmitting a data block into a shared-communications medium that constitutes a network, wherein the host computing device generates the data block and wherein the host computing device uses the device driver to transfer the data block to the station; wherein the first portion of network-specific data defines the network.

DETAILED DESCRIPTION

Figure 1:
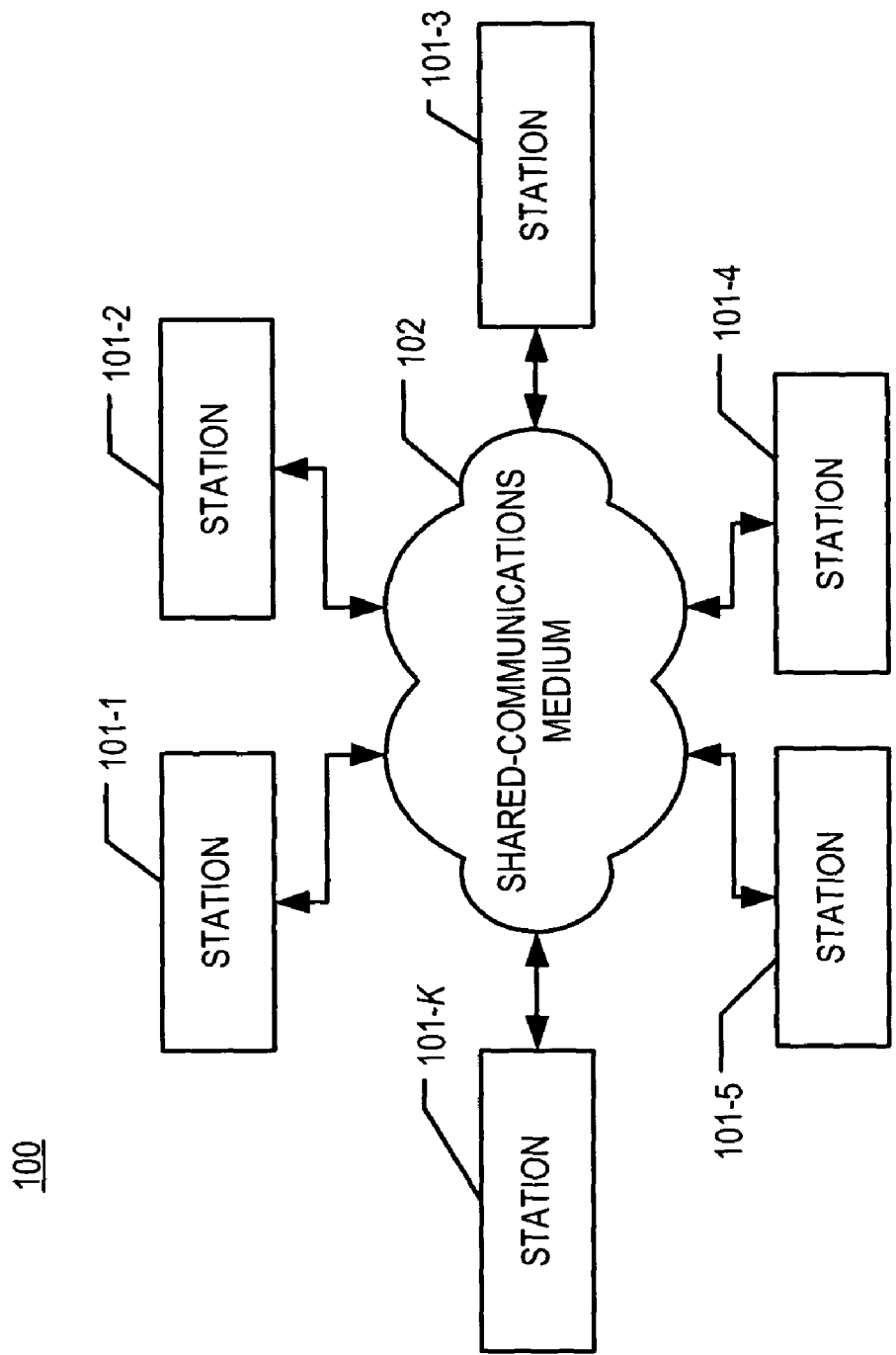
FIG. 1 depicts a schematic diagram of network 100 in the prior art.
Figure 2:
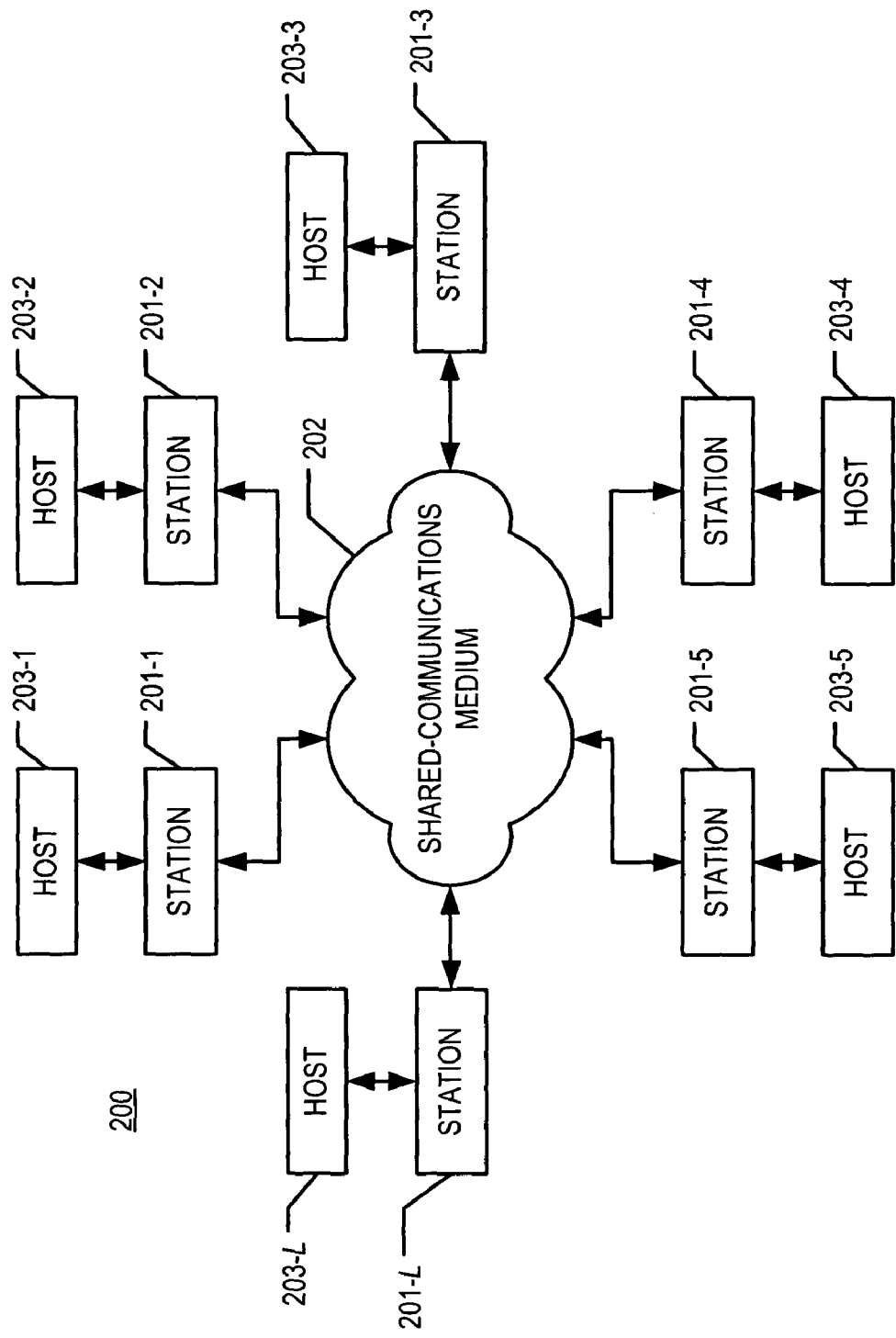
FIG. 2 depicts a schematic diagram of network 200 in accordance with the illustrative embodiment of the present invention.

FIG. 2 depicts a schematic diagram of network 200 in accordance with the illustrative embodiment of the present invention. Network 200 operates in accordance with a set of protocols (e.g., IEEE 802.11, etc.) and comprises telecommunications stations (or just "stations") 201-1 through 201-L, wherein L is a positive integer, and shared-communications medium 202, interconnected as shown. For example, network 200 can be a wireless local area network. It will be clear to those skilled in the art how to make and use shared-communications medium 202.

Station 201-$i$, for i=1 to L, is capable of receiving data blocks from host computing device 203-$i$ and transmitting over shared-communications medium 202 data frames comprising the data blocks received from host computing device 203-$i$. Station 201-$i$ is also capable of receiving data frames comprising data blocks from shared resource 202 and sending to host computing device 203-$i$ the data blocks. It will be clear to those skilled in the art, after reading this specification, how to make and use station 201-$i$.

Figure 3:
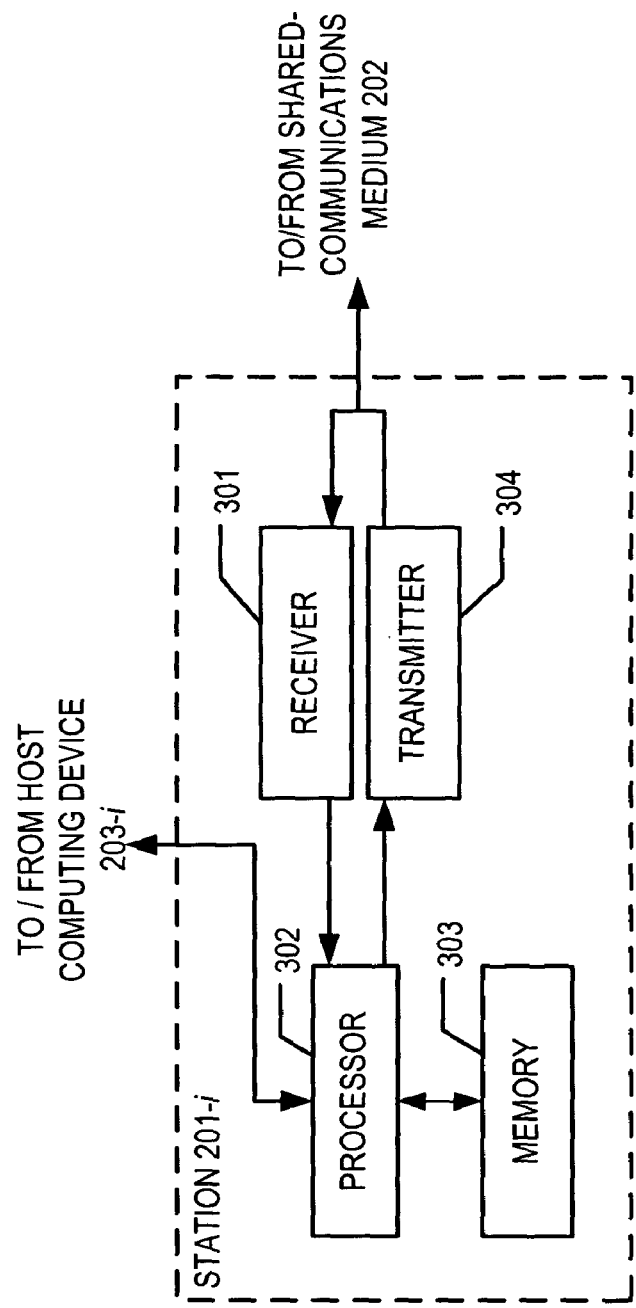
FIG. 3 depicts a block diagram of the salient components of station 201-*i* in accordance with the illustrative embodiment of the present invention.

FIG. 3 depicts a block diagram of the salient components of station 201-$i$ in accordance with the illustrative embodiment of the present invention. Station 201-$i$ comprises receiver 301-$i$, processor 302-$i$, memory 303-$i$, and transmitter 304-$i$, interconnected as shown.

Receiver 301-$i$ is a circuit that is capable of receiving frames from shared resource 202, in well-known fashion, and of forwarding them to processor 302-$i$. It will be clear to those skilled in the art how to make and use receiver 301-$i$.

Processor 302-$i$ is a general-purpose processor that is capable of performing the tasks described below and with respect to FIG. 5. It will be clear to those skilled in the art, after reading this specification, how to make and use processor 302-$i$.

Memory 303-$i$ is capable of storing programs and data used by processor 302-$i$. Memory 303-$i$ also stores one or more device driver files. The device driver is the software that host computing device 203-$i$ uses to interact with station 201-$i$. The device driver and associated files are to be described later. At least a portion of memory 303-$i$, in some embodiments, comprises flash memory, read-only memory, programmable read-only memory, magnetic disk memory, or compact disk memory.

Memory 303-$i$ also stores network-specific data. The set of network specific data describes network 200. The network-specific data, in some embodiments, define a network configuration and a security configuration. The network configuration addresses the aspects of network identification and access control. In some embodiments, the network identification comprises an IEEE 802.11 basic service set identifier (BSSID), as is known in the art. The security configuration addresses the aspects of authentication and privacy (e.g., through encryption, etc.).

Memory 303-$i$, in some embodiments, also stores an AutoRun file, a Setup executable file, or both. These files are to be described later.

It will be clear to those skilled in the art, after reading this specification, how to make and use memory 303-$i$.

Transmitter 304-$i$ is a circuit that is capable of receiving frames from processor 302-$i$, in well-known fashion, and of transmitting them on shared resource 202. It will be clear to those skilled in the art how to make and use transmitter 304-$i$.

Figure 4:
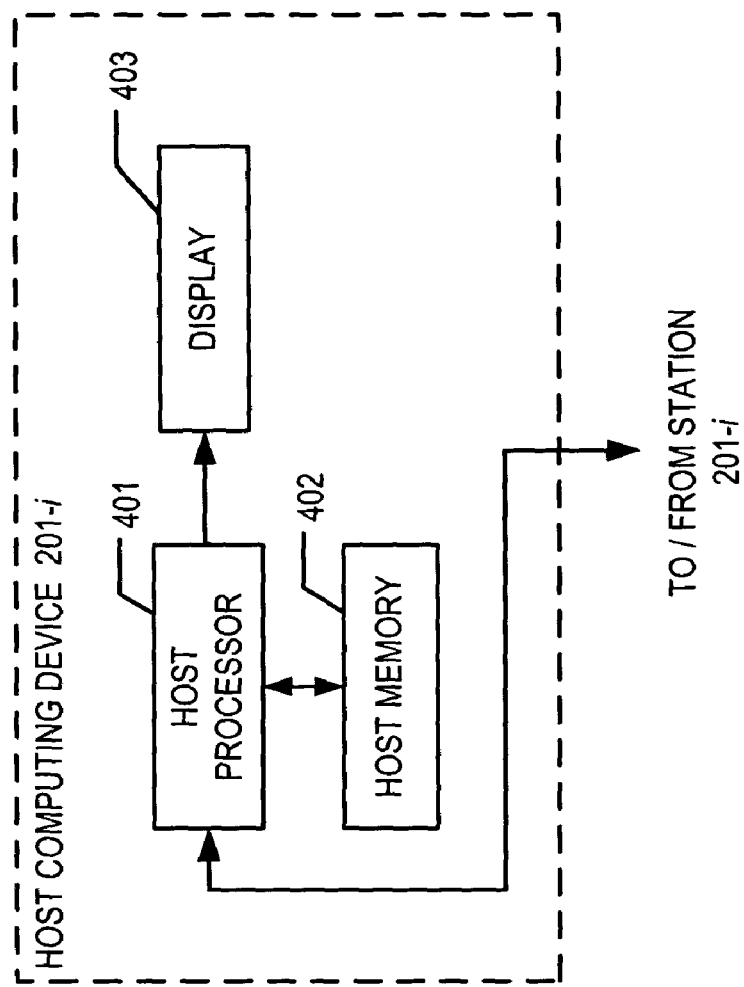
FIG. 4 depicts a block diagram of the salient components of host computing device 203-*i* in accordance with the illustrative embodiment of the present invention.

FIG. 4 depicts a block diagram of the salient components of host computing device 203-$i$ in accordance with the illustrative embodiment of the present invention. Host computing device 203-$i$ comprises processor 401-$i$, memory 402-$i$, and display 403-$i$, interconnected as shown.

Host processor 401-$i$ is a general-purpose processor that is capable of performing the tasks described below and with respect to FIG. 5. It will be clear to those skilled in the art, after reading this specification, how to make and use host processor 401-$i$.

Host memory 402-$i$ is capable of storing programs and data used by host processor 401-$i$. It will be clear to those skilled in the art how to make and use host memory 402-$i$.

Display 403-$i$ is capable of displaying information received from station 201-$i$. Display 403-$i$, in embodiments, displays a portion of the network-specific data from station 201-$i$. In some embodiments, display 403-$i$ is not present, such as where host computing device 203-$i$ is feature-limited or when the user of host computing device 203-$i$ does not need to have access to the network-specific data. It will be clear to those skilled in the art, after reading this specification, how to make and use display 403-$i$.

Figure 5:
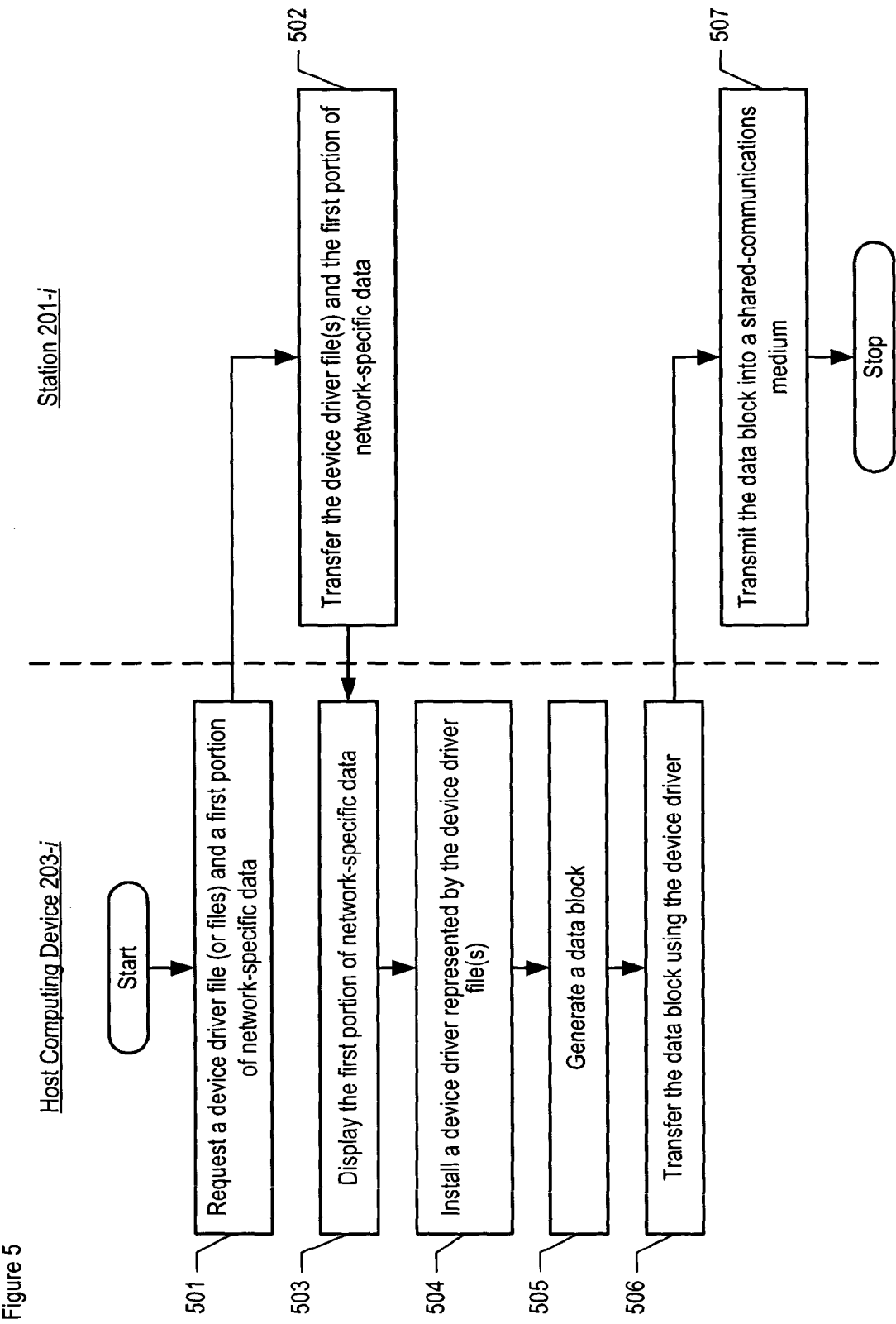
FIG. 5 depicts a flowchart of the illustrative embodiment of the present invention.

FIG. 5 depicts a flowchart of the salient tasks performed by the illustrative embodiment of the present invention. It will be clear to those skilled in the art which tasks depicted in FIG. 5 can be performed simultaneously or in a different order than that depicted.

At task 501, host computing device 203-$i$ requests one or more device driver files from station 201-$i$ in well-known fashion. This is triggered, for example, when host computing device 203-$i$ senses that it has become electrically coupled with station 201-$i$ after a user has plugged in a network interface card into a card slot of a laptop. It will be clear to those skilled in the art how to sense the presence of station 201-$i$ when plugged into host computing device 203-$i$.

In some embodiments, the request for one or more device driver files is generated in well-known fashion from an executable file (e.g., setup.exe, etc.) stored in memory 303-$i$ of station 201-$i$. Host computing device 203-$i$ runs the executable file—in some embodiments, after reading an AutoRun file in well-known fashion, also stored in memory 303-$i$.

At task 502, station 201-$i$ transfers the device driver files to host computing device 203-$i$. Station 201-$i$ also transfers a first portion of network-specific data. The first portion of network-specific data can comprise parameters provided to host computing device 203-$i$ for the purpose of providing status, general configuration information, diagnostic information, administration information, etc. It will be clear to those skilled in the art how to select which parameters constitute the first portion of network-specific data.

In some embodiments, station 201-$i$ refrains from transferring a second portion of network-specific data. The second portion can comprise at least one encryption key, at least one authentication key, or both, and is unreadable by host computing device 203-$i$. The second portion is unreadable by host computing device 203-$i$ to control, for example, how host computing device 203-$i$ uses network 200. It will be clear to those skilled in the art how to make and use station 201-$i$ so that the second portion of network-specific data cannot be read or overwritten by host computing device 203-$i$.

At task 503, in some embodiments, host computing device 203-$i$ displays on display 403-$i$ the first portion of network-specific data. For example, display 403-$i$ might show basic status such as the name of the present network and whether or not the signal strength is sufficient. At the other extreme, display 403-$i$ might show most or all of the network configuration, the security configuration, or both. It will be clear to those skilled in the art which network-specific data to display.

In some embodiments, station 201-$i$ continues to transfer network-specific data to host computing device 203-$i$ in well-known fashion. The data transferred can comprise parameters that change over time, such as the signal strength and the data rate over shared-communications medium 202. It will be clear to those skilled in the art how to select network-specific data that station 201-$i$ transfers to host computing device 203-$i$ on an ongoing basis.

At task 504, host computing device 203-$i$ installs the device driver that allows host computing device 203-$i$ to use station 201-$i$. The device driver files represent the device driver. Note that the device driver software installed into host computing device 203-*i* can be in a different form than that of the device driver files originally stored at station 201-*i*. In some embodiments, installing the device driver requires that the user specify selections for particular options (e.g., country selection, network name, channel selection, etc.). In other embodiments, installing does not require any user intervention. For example, when a user acquires a network interface card from a vending machine for use in the immediate area (e.g., at an airport, etc.), the user might not either know or care about the network specifics, other than what is advertised on the vending machine by the network provider.

At task 505, host computing device 203-*i* is ready to use station 201-*i*. Host computing device 203-*i* generates a data block in well-known fashion. An application program (e.g., an email reader/sender, etc.) that needs to send a message to another device via network 200 can generate the data block.

At task 506, host computing device 203-*i* transfers the data block to station 201-*i* in well-known fashion.

At task 507, station 201-*i* transmits the data block into shared-communications medium 202 in well-known fashion using the network configuration defined by the network-specific data. Station 201-*i* can encrypt the data block in well-known fashion using the security configuration (e.g., encryption keys, etc.) also defined by the network-specific data.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
    electrically connecting a network interface card with a host computing device, the network interface card comprising a memory with a device driver file and at least a first portion of network-specific data stored therein;
    in response to electrically connecting the network interface card, sending the device driver file and the first portion of network-specific data from the network interface card to the host computing device;
    receiving an option for device driver installation, wherein the option is not selectable in the device driver file or in the first portion of network-specific data;
    installing the sent device driver file based on the received option;
    storing a second portion of network-specific data at the memory of the network interface card that is not accessible by the host computing device, wherein the second portion of network-specific data comprises at least one parameter for controlling use of a network by the host computing device, and wherein the at least one parameter sets a length of time that the host computing device can access the network once access is granted; and
    receiving a data block from the host computing device, wherein the host computing device uses the device driver to transfer the data block to the network interface card, wherein the first portion of network-specific data comprises a plurality of pre-configured network-specific parameters that enable the host computing device to access the network, and wherein the network interface card controls access to the network by the host computing device using the second portion of network-specific data.

2. The method of claim 1, farther comprising displaying the first portion of network-specific data at the host computing device.

3. The method of claim 1, farther comprising storing an AutoRun file and a Setup file on the network interface card.

4. The method of claim 1, wherein the memory one of a flash memory, a read-only memory, a programmable read-only memory, and a magnetic disk memory.

5. The method of claim 1, wherein the network-specific data define a security configuration and a network configuration.

6. The method of claim 5, wherein the security configuration comprises encryption-related and authentication-related parameters, and wherein the network configuration comprises a network identifier.

7. The method of claim 6, wherein the network identifier is an IEEE 802.11 basic service set identifier.

8. A network interface card, comprising:
    a memory for storing at least a device driver file and network-specific data, comprising a first portion of network-specific data and a second portion of network-specific data, wherein the first portion of network-specific data comprises a plurality of pre-configured network-specific parameters that enable a host computing device to access a network, wherein the second portion of network-specific data comprises at least one parameter for controlling use of the network by the host computing device, and wherein the at least one parameter sets a length of time that the host computing device can access a network once access is granted;
    a host interface for transferring the device driver file and the first portion of network-specific data; and a transmitter for transmitting a data block into the network, wherein the data block is received from the host computing device using a device driver represented by the device driver file, wherein the second portion of network-specific data is unreadable by the host computing device, wherein the network interface card is configured to electrically couple with a card slot of the host computing device, and wherein the host interface is configured to trigger transfer of the device driver file and the first portion of network-specific data to the host computing device upon electrically coupling with the host computing device.

9. The network interface card of claim 8, wherein the network-specific data define a security configuration and a network configuration.

10. The network interface card of claim 9, wherein the security configuration comprises encryption-related and authentication-related parameters, and wherein the network configuration comprises a network identifier.

11. The network interface card of claim 10, wherein the network identifier is an IEEE 802.11 basic service set identifier.

12. The network interface card of claim 8, further comprising a host computing device for:
    installing the device driver;
    generating the data block; and
    displaying the first portion of network-specific data.

13. The network interface card of claim 8, wherein the memory is also for storing an AutoRun file and a Setup file.

14. The network interface card of claim 8, wherein the memory comprises one of a flash memory, a read-only memory, a programmable read-only memory, and a magnetic disk memory.

15. An apparatus comprising:
    a network interface card comprising a memory with a device driver file and at least a first portion of network-specific data stored therein, wherein the first portion of network-specific data comprises a plurality of pre-configured network-specific parameters that enable a host computing device to access a network, wherein the network interface card is at least configured for:
- connecting to a host computing device;
- sending the device driver file and the first portion of network-specific data from the network interface card to the host computing device;
- storing a second portion of network-specific data at the memory of the network interface card, wherein the second portion of network specific data is not accessible by the host computing device, wherein the second portion of network specific data comprises at least one parameter for controlling use of a network by the host computing device, and wherein the at least one parameter sets a length of time that the host computing device can access the network once access is granted; and
- transmitting a data block into the network based on the second portion of network-specific data; and the host computing device, comprising a card slot configured for electrically connecting with the network interface card, the host computing device configured for:
- receiving the device driver file and the first portion of network-specific data;
- selecting an option for device driver installation, wherein the option is not selectable in the device driver file or in the first portion of network-specific data;
- installing a device driver that is represented by the device driver file based on the selected option;
- generating the data block; and using the device driver to transfer the data block to the transceiver, wherein the first portion of network-specific data is configured to control access by the host computing device to the network, and wherein the host computing device is unable to read the second portion of network-specific data.

16. The apparatus of claim 15, wherein the host computing device is also for displaying the first portion of network-specific data.

17. The apparatus of claim 15, wherein the host computing device is also for:
- reading an AutoRun file; and
- executing a Setup file; wherein the AutoRun file and the Setup file are stored at the station and wherein the Setup file is for installing the device driver at the host computing device.

18. The apparatus of claim 15, wherein the transceiver is also for storing the device driver file in one of a flash memory, a read-only memory, a programmable read-only memory, and a magnetic disk memory.

19. The apparatus of claim 15, wherein the first portion of network-specific data and the second portion of network-specific data define a security configuration and a network configuration.

20. The apparatus of claim 19, wherein the security configuration comprises encryption-related and authentication-related parameters, and wherein the network configuration comprises a network identifier.

21. The apparatus of claim 20, wherein the network identifier is an IEEE 802.11 basic service set identifier.

22. A host computing device, comprising:
- means for electrically coupling with network interface card, the network interface card comprising a memory with a device driver file and at least a first portion of network-specific data stored therein, wherein the first portion of network-specific data comprises a plurality of pre-configured network-specific parameters that enable the host computing device to access a network;
- means for receiving the device driver file and the first portion of network-specific data from the station, wherein the network interface card stores a second portion of network-specific data configured to control access to a network and configured to be unreadable by the means for receiving, wherein the second portion of network-specific data comprises at least one parameter for controlling use of the network by the host computing device, and wherein the at least one parameter sets a length of time that the host computing device can access the network once access is granted;
- means for selecting an option for device driver installation, wherein the option is not selectable in the device driver file or in the first portion of network-specific data;
- means for installing at the means for receiving a device driver that is represented by the device driver file based on the selected option; and means for transmitting a data block into the network, wherein the means for receiving generates the data block, wherein the means for receiving uses the device driver to transfer the data block to the network interface card, and wherein the first portion of network-specific data is configured to enable the means for receiving to access the network.

23. The host computing device of claim 22, further comprising means for displaying the first portion of network-specific data at the means for receiving.

24. The host computing device of claim 22, further comprising means for reading an AutoRun file and for executing a Setup file, wherein the AutoRun file and the Setup file are stored on the station and wherein the Setup file is for installing the device driver at the means for receiving.

25. The host computing device of claim 22, wherein the device driver file is stored at the station in one of a flash memory, a read-only memory, a programmable read-only memory, and a magnetic disk memory.

26. The host computing device of claim 22, wherein the network-specific data define a security configuration and a network configuration.

27. The host computing device of claim 26, wherein the security configuration comprises encryption-related and authentication-related parameters, and wherein the network configuration comprises a network identifier.

28. The host computing device of claim 27, wherein the network identifier is an IEEE 802.11 basic service set identifier.

* * * * *

UNITED STATES PATENT AND TRADEMARK OFFICE
CERTIFICATE OF CORRECTION

| | | |
|---|---|---|
| PATENT NO. | : 7,836,445 B2 | |
| APPLICATION NO. | : 10/693051 | |
| DATED | : November 16, 2010 | |
| INVENTOR(S) | : La Gesse et al. | |

It is certified that error appears in the above-identified patent and that said Letters Patent is hereby corrected as shown below:

IN THE SPECIFICATIONS:

Column 3, line 36, delete "network specific" and insert -- network-specific --.

IN THE CLAIMS:

Column 5, line 65, in Claim 2, delete "farther" and insert -- further --.

Column 6, line 1, in Claim 3, delete "farther" and insert -- further --.

Column 6, line 3, in Claim 4, delete "memory" and insert -- memory comprises --.

Column 7, line 11, in Claim 15, delete "network specific" and insert -- network-specific --.

Column 7, line 13, in Claim 15, delete "network specific" and insert -- network-specific --.

Signed and Sealed this
Ninth Day of August, 2011

David J. Kappos
*Director of the United States Patent and Trademark Office*